United States Patent Office 2,977,326

Patented Mar. 28, 1961

2,977,326

ACTIVATED REFRACTORY INORGANIC OXIDE

William G. Nixon, Westchester, Ill., assignor to Universal Oil Products Company, Des Plaines, Ill., a corporation of Delaware No Drawing. Filed Dec. 15, 1958, Ser. No. 780,195

16 Claims. (Cl. 252—466)

The present invention relates to the activation of refractory inorganic oxide material, and particularly to the activation of a refractory inorganic oxide for subsequent utilization as the carrier material in the manufacture of catalytic composites. More specifically, the present invention is directed toward a method of preparing an improved alumina which is particularly adaptable for use as catalytic carrier material or as an adsorbing or desorbing medium.

Benefits afforded, through the utilization of the method of the present invention, are applicable to the manufacture of the refractory inorganic oxide material, the regeneration of a used refractory inorganic oxide, such as alumina which has been employed as a desiccant or silica-alumina employed as a cracking catalyst, the manufacture of a catalytically active composite in which the refractory inorganic oxide comprises a major portion thereof, and in the regeneration of such catalytic composites which have become highly deactivated as a result of extended periods of use. Various other applications of the present invention, which employs sulfur trioxide in treating the refractory inorganic oxide material, will become readily apparent from the discussion hereinafter set forth, as well as from the appended claims.

A variety of refractory inorganic oxides are widely employed throughout commercial industries, and particularly within the petroleum and chemical industries, either as a catalyst in and of themselves, as a carrier material in the manufacture of catalysts containing active metallic components, or as a desiccant, purifying, dehydrating or adsorbing agent, etc. In the present specification and the appended claims, the term refractory inorganic oxide is intended to mean the various oxides of inorganic metals and non-metals, and is inclusive of alumina, silica, magnesia, thoria, zirconia, titania, boria, mixtures of two or more, etc. It is understood that the refractory inorganic oxide material may be naturally occurring earths, clays, sands and/or minerals, or they may be synthetically prepared through the use of any of the well-known laboratory methods of preparation.

The widespread use of refractory inorganic oxide material results from its inherently high degree of porosity, as well as its physical and chemical stability when being subjected to excessively high temperatures. As hereinabove set forth, there exists a multitude of refractory inorganic oxides, all of which possess surface-area characteristics making them highly suited for utilization in removing liquid contaminants from liquid and gaseous streams, solid contaminants from liquid and gaseous streams, etc. The refractory material most frequently employed, in view of the high porosity, or adsorptive capacity, is alumina, silica and mixtures of the two. The addition of other inorganic oxides is generally effected for the purpose of imparting certain desired physical and/or chemical characteristics to the final composite.

The object of the present invention is to produce refractory inorganic oxide material possessing an unusually high degree of adsorptive capacity, through the enhancement of the surface-area characteristics. Surface-area characteristics are defined as the surface-area, expressed as square meters per gram: pore volume, expressed as cubic centimeters per gram; and pore diameter, expressed in Angstrom units (A.). It has been found that refractory inorganic oxide material possessing greater surface area, coupled with a smaller pore diameter, results in improved adsorptive capacity when serving as an adsorbing, treating or purifying agent. When utilized as the carrier material in a catalytic composite, these improved surface-area characteristics result in a more thorough distribution of the various catalytic components which are ultimately combined therewith.

In one embodiment, the present invention provides a method for activating a refractory inorganic oxide which comprises contacting said refractory inorganic oxide with sulfur trioxide.

In another embodiment, the present invention relates to a method for activating refractory inorganic oxide material which comprises contacting said refractory inorganic oxide with sulfur trioxide in a non-reducing atmosphere and at a temperature in excess of 100° C.

In a specific embodiment, the present invention affords a method for activating refractory inorganic oxide material which comprises contacting said refractory inorganic oxide with sulfur trioxide, at a temperature within the range of from about 100° C. to about 500° C. and in a non-reducing atmosphere, and thereafter calcining the refractory inorganic oxide at a temperature in excess of about 500° C.

Another object of the present invention is to produce a refractory inorganic oxide, and particularly alumina, for subsequent utilization as the carrier material for catalysts containing one or more catalytically active metallic components. There results a more active catalyst than has heretofore been obtained, and in addition, there is indicated a greater degree of catalytic stability. This increased activity and stability appears to be due, at least in part, to the resulting increased surface area and decreased pore diameter, which in turn afford a more thorough distribution of the various catalytically active components. Other beneficial aspects derived through the utilization of sulfur trioxide are hereinafter described.

Therefore, in another embodiment, the present invention relates to a method for manufacturing a catalyst consisting essentially of a major portion of a refractory inorganic oxide and a minor portion of at least one catalytically active metal component, which method comprises preparing the refractory inorganic oxide, contacting said refractory inorganic oxide with sulfur trioxide and thereafter compositing said catalytically active metallic component therewith.

In a more specific embodiment, the present invention provides a method for manufacturing a sulfur-containing, alumina-platinum catalytic composite which comprises preparing said alumina and drying the same at a temperature not in excess of 100° C., contacting the resulting dried alumina with sulfur trioxide in a non-reducing atmosphere and at a temperature within the range of about 15° C. to about 500° C., commingling the sulfur trioxide-treated alumina with a platinum-containing compound in an amount to yield a final catalytic composite containing from about 0.01% to about 10% by weight of platinum, and thereafter calcining the alumina-platinum catalytic composite at a temperature in excess of about 500° C.

When synthetic, the refractory inorganic oxide material, to be improved through the utilization of the method of the present invention, may be prepared by any of the well known, suitable means of manufacture. For example, alumina may be readily prepared through the addition of an alkaline reagent to a salt of aluminum in an amount to form aluminum hydroxide which, upon drying and calcining, is converted to alumina; silica may be prepared conveniently through the acidification of water glass; and a refractory inorganic oxide comprising both alumina and silica may be prepared by separate, successive or co-precipitation means. It is neither essential to the method of the present invention that the refractory inorganic oxide be prepared in any particular manner, nor is it required that the refractory inorganic oxide exist in any special physical shape or form. Similarly, when the method of the present invention is made an integral part of the manufacture of the catalytic composite, the overall scheme of the manufacturing process is not essential. The methods of catalyst manufacturing, as well as the various types thereof, are adequately described in the prior art. The essential feature of the method of the present invention is the utilization of sulfur trioxide in a non-reducing atmosphere; the ultimate use for which the oxide is designated, is not intended to be a limitation upon the broad scope of the present invention. The method of the present invention insures completely uniform and thorough distribution of catalytic components within and throughout the carrier material by providing a refractory inorganic oxide of increased surface area and decreased pore diameter. When the refractory inorganic oxide is employed, in and of itself, as a catalyst or a desiccant or similar treating agent, the preparation of the same is not a material restriction on the scope of the present invention.

Although the method of the present invention affords particular advantages to the utilization of refractory inorganic oxide material as the carrier material in the manufacture of catalytic composites containing platinum, other noble metals such as iridium, palladium, ruthenium, rhodium and catalytic composites containing other metals such as cobalt, nickel, iron, molybdenum, and other metals of groups VI and VIII, may be benefited through its use. It is understood that the advantages afforded catalysts containing various metallic components are not equivalent, and the effects of employing the method of the present invention with a particular metallic component, or combination of components, are not necessarily the effects observed in regard to some other metal component, or mixture of metal components.

Generally, the quantity of the metal component composited with the refractory inorganic oxide material is comparatively minor with respect to the total composite. Platinum and/or palladium, and other noble metals, will usually comprise from about 0.01% to about 10% by weight of the total catalytic composite, and often smaller amounts within the range of about 0.1% to about 1% by weight. Halogen is generally composited with the catalyst in concentrations of about 0.01% to about 8% by weight of the total catalyst, calculated on a dry basis, and as the elemental halogen and may be either fluorine, chlorine, or a combination thereof.

In the interest of brevity, the following discussion is limited to the preparation of alumina, and its subsequent use as the carrier material in the manufacture of catalysts comprising platinum. It is understood that the method of the present invention is not considered to be unduly limited thereto.

Alumina, when impregnated with a noble metal component, particularly platinum, and various non-metallic components such as chlorine and/or fluorine, yields a catalytic composite particularly adaptable to the reforming of hydrocarbons. Further, the platinum-alumina-combined halogen catalyst promotes a variety of desirable reactions during the reforming of hydrocarbons, including (as a principal reaction) the dehydrogenation of naphthenes to aromatics, hydrocracking, isomerization of straight-chain paraffins, and to a somewhat lesser extent, the dehydrocyclization of various paraffins directly to aromatics. Through the appropriate selection of operating conditions, which are, to a great extent, dependent upon the physical and chemical characteristics of the material to be processed, this particular type of catalyst may be employed for an extended period of time without experiencing excessive deactivation resulting in the necessity for frequent regeneration to restore catalyst activity.

Catalyst deactivation may result from any one, or a combination of adverse effects; it may result from substances which are peculiar to a particular catalyst, and which either effect a change in the physical and/or chemical state of the various individual components of the catalyst, or which result in the removal of said components. The deposition of coke and other heavy carbonaceous material is a direct, and frequent, cause of catalyst deactivation, such deposits being experienced to a great degree during the initial, early stages of the reforming operation while the catalyst employed therein exists in its most highly active state with regard to the entire period of operation. This high degree of coke deposition is believed to be due to the inherent ability of fresh, highly active catalyst to promote preferentially certain reactions which have been found to be detrimental to catalyst activity and stability. As the period of time during which the catalyst is employed is extended, the preference to promote these detrimental reactions diminishes until such time as it no longer exists effectively. However, at this particular stage of the process, the catalyst has become deactivated to the degree that it is no longer capable of performing its intended function to the necessary and desired extent. One particular reaction which is especially deleterious to the activity of catalysts employed in processes for the reforming of hydrocarbons, particularly platinum-containing catalysts, and which reaction is extensively promoted by fresh, highly active catalyst, is the demethylation reaction. At the operating conditions generally employed during the reforming process, the demethylation reaction causes excessive coke deposition initially, and results thereby in extremely rapid catalyst deactivation.

That the demethylation reaction is promoted to a greater extent by new, highly-active noble metal-containing catalysts, than by the same catalyst after a comparatively short period of use, is believed to be due to the presence, within the catalytic composite, of a necessary excess of catalyst activity. In order to achieve an extended, successful catalyst life, the composite, when initially employed, contains a sufficient reserve of catalytically active components. This reserve provides the insurance needed for the depletion, by normal deterioration, of the catalytic components over extended periods of time. The presence of this necessary excess of catalyst activity has the tendency to induce the undesirable side reactions, especially the demethylation reaction, and consequently causes excessive, early deposition of coke and carbonaceous material. The method of the present invention results in a platinum-containing catalyst which successfully inhibits these reactions until such time as they are no longer consequential, not being promoted preferentially.

It is recognized that the prior art is replete with instances of the employment of sulfur, and compounds thereof, for the purpose of inhibiting undesirable reactions, and, to a certain extent, in order to control the promotion and rate of these reactions during the period of processing in which there is induced the greatest detrimental effects. In order to obtain the benefits afforded through the presence of sulfur within the reaction zone, it has previously been considered necessary that a suitable sulfur-containing compound be continuously added, in comparatively large quantities, to the liquid charge to the reforming zone, or, as a sulfur-containing gaseous substance directly to the hydrogen-rich gas stream generally being continuously recycled as an integral portion of the reforming process. There are incurred, however, unnecessary difficulties in metering, handling and controlling the gaseous and/or liquid substances, as well as insuring a sufficiency of sulfur when particularly desired. Also, many processes utilize a catalytic composite in which sulfur has been specifically made a particular component, usually by providing the catalyst with active metal components existing as the sulfide. It is well known that such sulfur is readily susceptible to rapid removal through the reduction of the metal to a lower valence state.

Stringent exercise over the control of the concentration of the sulfur present in the reaction zone is of major import in view of the fact that sulfur is well known to be an effective deactivator of noble metal catalysts. Through the method of the present invention, a minor quantity of sulfur (with respect to the total of the overall composite), which quantity will suffice to suppress the detrimental reactions prevalent at the outset of the operation of the process, as well as suppress excessive hydrocracking during the remaining portion of the process, is utilized as a component of the catalytic composite employed within the reaction zone.

The utilization of sulfur trioxide, in treating the refractory inorganic oxide, preferably before the active metallic components have been composited therewith, results in the major portion of sulfur to become composited within the refractory inorganic oxide material, rather than with the catalytically active metallic components. As hereinbefore stated, it is particularly preferred that the sulfur trioxide treatment is effected in a non-reducing atmosphere. The presence of reducing agents, and particularly hydrogen, has the tendency to nullify, at least in part, the enhancement of the surface-area characteristics. Further, there is exhibited the prevention of the incorporation of sulfur within the refractory inorganic oxide, such that the ultimate catalytic composite is not sufficiently effective in depressing the initially detrimental reactions hereinbefore described.

The quantity of sulfur thus deposited is sufficiently great to inhibit successfully the detrimental reactions at the outset of the operation, and is not easily susceptible to virtually complete leaching therefrom during the process being effected. That a sufficient quantity of sulfur possesses the tenacity to remain as a component of the catalyst, eliminates the requirement for extensive, continuous, and/or intermittent, sulfur addition throughout the process in order to replenish that sulfur which is removed. There is insured, thereby, a substantially constant level of catalyst activity and control with respect to the combination of the desired reactions. The catalyst within the reforming zone will be caused to successfully inhibit the deleterious reactions during that period of operation in which these reactions are no longer of consequence with respect to those reactions which are desired to be promoted.

The present invention insures completely uniform distribution of the catalytic components within and throughout the carrier material by providing a refractory inorganic oxide possessing increased surface area and decreased pore diameter. The exact nature of the phenomenon, effected through the use of sulfur trioxide, which phenomenon results in the beneficial changes in surface area and pore diameter is not known precisely. It has been found, that the treatment with sulfur trioxide yields a refractory inorganic oxide material having enhanced surface-area characteristics heretofore not obtained, as well as possessing a substantially greater crushing strength. The improvement in surface-area characteristics is effected whether the inorganic oxide is first prepared by some suitable well known method and subsequently treated with sulfur trioxide, or the latter treatment is made an integral step within the method of manufacture. It is preferred however, that the refractory material be contacted with sulfur trioxide prior to subjecting the inorganic oxide to a high temperature calcination treatment. It is further preferred that the treatment with sulfur trioxide be effected while the inorganic oxide exists in a wet state. Such wet state is not necessarily limited to the visual observance of moisture; wet refractory oxide material includes that which is visually dry, but is saturated within with excessive quantities of physically combined water, which water is rapidly removed during high temperature drying, distinguished from calcination in that the former is effected at temperatures substantially below those of the latter, but which temperatures are significantly in excess of the boiling point of water.

The length of the sulfur trioxide treatment as well as the concentration, or total amount, of sulfur trioxide contacting the inorganic oxide material, is dependent upon a variety of inter-related aspects. The amount of water, both free and combined, the quantity of the inorganic oxide to be contacted, the particular means employed to disperse the sulfur trioxide throughout the refractory material, and, as hereinbefore described, the quantity of sulfur desired to be ultimately combined with the final inorganic oxide, are considerations which determine the quantity of sulfur trioxide and the length of the treatment to be employed. A definite stage, during the treatment with sulfur trioxide, appears to exist at which the maximum change in surface area characteristics has taken place. Any further treatment with sulfur trioxide would be uneconomical, and no advantage in employing an excess thereof is readily foreseen. It appears that the sulfur trioxide treatment has attained its maximum effectiveness when the refractory inorganic oxide material has become substantially free from combined water.

The following examples are given for the purpose of illustrating the method of the present invention, and to indicate more clearly the benefits to be derived through the utilization thereof. It is not intended that the present invention be limited unduly to the particular reagents, processing conditions and/or concentrations employed within the examples. Insignificant modifications, within the scope and spirit of the appended claims will become readily apparent to those skilled in the art.

*Example I*

Aluminum chloride hydrosol, having an aluminum to chloride weight ratio of 1.2:1 was employed in accordance with the well known oil drop method in preparing alumina hydrogel spheroids. A portion of the alumina spheroids was dried to a temperature of 250° F., placed within a glass furnace tube, and therein subjected to a calcination treatment at an elevated temperature of 500° C. The furnace tube was maintained at this temperature for a period of about two hours, after which time the tube was allowed to cool to room temperature; the calcined alumina spheres were removed and subsequently analyzed to determine the surface-area characteristics. The pore diameter of the spheres was found to be 133° (Angstrom units), and the surface area, 201 square meters per gram; the determinations were made in accordance with the standard Brunauer-Emmett-Teller nitrogen adsorption procedure. In addition, substantially 100% of the calcined alumina spheres had an average crushing strength of about 12 to 15 pounds.

This example sets forth what is considered to be a standard method for finishing a refractory inorganic oxide material subsequent to the preparation thereof. The following examples are given to indicate the benefits afforded through the incorporation of the sulfur trioxide treatment as an integral step of the finishing procedure. As hereinbefore set forth, the precise method by which the alumina is initially prepared, is not limiting upon the method of the present invention.

*Example II*

Eight hundred cubic centimeters of wet, uncalcined alumina spheres, prepared by the oil-drop method, were washed with methyl alcohol and water for the purpose of removing various contaminants such as miscellaneous organic matter remaining from the preparation of the spheres. These wet spheres were permitted to dry overnight by exposure to air at room temperature (approximately 80° F.). A 30 cubic centimeter portion of the air-dried spheres were placed in a furnace tube, and subsequently treated from a temperature of 150° C. to about 500° C. with sulfur trioxide. Surface area analyses indicated a surface area of 325 square meters per gram, a pore volume of 0.654 cubic centimeter per gram and a pore diameter of 80 A. A determination of the crushing strength indicated that the average strength was 25–30 pounds, and that 36.7% of the spheres tested possessed a crushing strength in excess of 30 pounds.

*Example III*

Ninety cubic centimeters of wet, uncalcined alumina spheres were washed with a mixture of methyl alcohol and water to remove various organic contaminants. The washed spheres were dried at room temperature (approximately 80° F.) in the presence of an air stream. The air dried spheres were placed in a glass furnace tube and therein subjected to high temperature calcination at 500° C. for a period of two hours. Surface area analyses indicated a surface area of 269 square meters per gram, a pore volume of 0.765 cubic centimeter per gram and a pore diameter of 114 A.

The foregoing examples are presented to illustrate the method of employing the present invention in the manufacture of refractory inorganic oxide material, and indicate the benefits afforded through the utilization thereof. The pertinent operating conditions, and the surface-area characteristics are given in the following abbreviated table.

| Example No. | I | II | III |
|---|---|---|---|
| Sulfur Trioxide Treatment | No | Yes | No |
| Processing Temperatures, ° C.: | | | |
| Drying | 121 | 27 | 27 |
| $SO_3$ Treatment | ---------- | [1] 150–500 | ---------- |
| Calcining | 500 | 500 | 500 |
| Surface-Area Characteristics: | | | |
| Area | 201 | 325 | 269 |
| Pore Volume | ---------- | 0.654 | 0.765 |
| Pore Diameter | 133 | 80 | 114 |
| Crushing Strength | 12–15 | 25–30 | 12–15 |

[1] As stated in Example II, the sulfur trioxide-treatment was effected throughout the tekperature range of 150° C. to 500° C.

The use of sulfur trioxide in Example II has resulted in an increase in surface area of 62%, and a corresponding decrease in pore diameter of 66%, when compared to the surface-area characteristics resulting from Example I. In addition, the average crushing strength of the alumina spheres has increased significantly, from a value of 12 to 15 pounds for the untreated spheres, to a value of 25 to 30 pounds for the treated spheres. The resulting increased crushing strength is of particular importance when the spheres are ultimately to be utilized in the manufacture of catalytic composites, for the addition of various catalytic components tends to weaken the physical structure, thereby effecting a decrease in crushing strength. Through the method of the present invention, insurance is provided whereby the decrease in crushing strength is not to the extent which makes the use of the catalyst impractical.

Comparing the results of Examples I and III, indicates the degree of enhancement of the surface-area characteristics which can be attributed to the treating of wet spheres. Although the spheres of Example III were visually "dry," the absence of the high-temperature drying, as in Example I, has caused the spheres to retain the combined water, resulting in an increase in surface area of 34% and a decrease in pore diameter of 42%.

Briefly, the preferred method of the present invention, for the manufacture of activated refractory inorganic oxide material, particularly alumina which is especially adaptable for use as the carrier material in the manufacture of catalysts, comprises preparing alumina by any suitable method in any desired physical shape or form. The alumina is then dried at a low temperature, approximating room temperature, for the purpose of removing the visually observed free water. Sulfur trioxide is employed, at a temperature in excess of 100° C., and preferably over a temperature range of 150° C. to 500° C., to enhance the surface-area characteristics, and the sulfur trioxide contacts the alumina in a non-reducing atmosphere. To insure the latter, the alumina may be purged, prior to the sulfur trioxide treatment, with any suitable gaseous material which is unreactive with either the alumina or the sulfur trioxide. Purge material which would be suitable includes, therefore, air, nitrogen, argon and the other inert gases, etc. Following the use of sulfur trioxide, the temperature of the alumina is increased to a level in excess of 500° C., with an upper limit of about 1000° C., and the treated alumina is calcined at the elevated temperature.

The resulting sulfur-containing refractory inorganic oxide material is possessed with surface-area characteristics which enhance its use as a dehydrating, adsorbing, desorbing, or other treating agent, as a catalyst in and of itself, or as a carrier material for other catalytically active components.

I claim as my invention:

1. A method for activating an adsorptive refractory inorganic oxide which comprises contacting said refractory inorganic oxide, at a temperature in excess of 100° C., with sufficient sulfur trioxide in a non-reducing atmosphere to increase the adsorptive capacity of the refractory oxide.

2. The method of claim 1 further characterized in that said refractory oxide is selected from the group consisting of alumina, silica, magnesia, thoria, zirconia, titania and boria.

3. The method of claim 1 further characterized in that said temperature is within the range of from about 100° C. to about 500° C.

4. A method for activating an adsorptive refractory inorganic oxide which comprises contacting said refractory inorganic oxide, at a temperature within the range of from about 100° C. to about 500° C., with sufficient sulfur trioxide in a non-reducing atmosphere to increase the adsorptive capacity of the refractory oxide and thereafter calcining the refractory inorganic oxide at a temperature in excess of about 500° C.

5. The method of claim 4 further characterized in that said refractory inorganic oxide is alumina.

6. The method of claim 4 further characterized in that said refractory inorganic oxide is silica.

7. A method for manufacturing a catalyst consisting essentially of a major portion of a refractory inorganic oxide and a minor portion of at least one catalytically active metal component, which method comprises preparing an adsorptive refractory inorganic oxide, contacting said refractory inorganic oxide at about 100°–500° C. with sufficient sulfur trioxide in a non-reducing atmosphere to increase the adsorptive capacity of the refractory oxide and thereafter compositing said catalytically active metal component therewith.

8. The method of claim 7 further characterized in that said catalytically active metal component comprises a noble metal.

9. The method of claim 7 further characterized in that said refractory inorganic oxide is alumina.

10. A method for manufacturing an alumina-platinum catalytic composite which comprises preparing the alumina, contacting said alumina at about 100°–500° C. with sufficient sulfur trioxide in a non-reducing atmosphere to increase its adsorptive capacity, compositing platinum with the resulting sulfur trioxide-treated alumina and thereafter calcining the alumina-platinum catalytic composite.

11. A method for manufacturing an alumina-platinum catalytic composite which comprises preparing the alumina, contacting said alumina, at a temperature in excess of 100° C., with sufficient sulfur trioxide in a non-reducing atmosphere to increase its adsorptive capacity, combining platinum with the resulting sulfur trioxide-treated alumina and thereafter calcining the alumina-platinum catalytic composite at a temperature in excess of about 500° C.

12. The method of claim 11 further characterized in that said alumina is contacted with sulfur trioxide at a temperature within the range of from about 100° C. to about 500° C.

13. A method for manufacturing an alumina-platinum catalytic composite which comprises preparing said alumina and drying the same at a temperature below about 100° C., contacting the resulting dried alumina with sufficient sulfur trioxide in a non-reducing atmosphere to increase its adsorptive capacity at a temperature within the range of from about 100° C. to about 500° C., combining the sulfur trioxide-treated alumina with platinum and thereafter calcining the resulting alumina-platinum composite at a temperature in excess of about 500° C.

14. The method of claim 13 further characterized in that said sulfur trioxide-treated alumina is combined with a platinum-containing component in an amount to yield a catalytic composite containing from about 0.01% to about 10% by weight of platinum.

15. A method for manufacturing an alumina-platinum catalytic composite which comprises preparing said alumina and drying the same at a temperature not in excess of about 100° C., contacting the resulting dried alumina with sufficient sulfur trioxide to increase its adsorptive capacity at a temperature within the range of from about 150° C. to about 500° C. and in a non-reducing atmosphere, commingling the resulting sulfur trioxide-treated alumina with a platinum-containing compound in an amount to yield a final catalytic composite containing from about 0.01% to about 10% by weight of platinum.

16. A method for manufacturing a sulfur-containing alumina-platinum catalytic composite which comprises preparing said alumina and drying the same at a temperature not in excess of about 100° C., contacting the resulting dried alumina with sufficient sulfur trioxide in a non-reducing atmosphere to increase its adsorptive capacity at a temperature within the range of about 150° C. to about 500° C., commingling the sulfur trioxide-treated alumina with a platinum-containing compound in an amount to yield a final catalytic composite containing from about 0.01% to about 10% by weight of platinum, and thereafter calcining the sulfided alumina-platinum catalytic composite at a temperature in excess of about 500° C.

References Cited in the file of this patent

UNITED STATES PATENTS 2,590,124 Reeder ---------------- Mar. 25, 1952